United States Patent
Chou et al.

[19]

[11] Patent Number: 6,095,553

[45] Date of Patent: Aug. 1, 2000

[54] SIDE IMPACT SENSOR SYSTEM AND METHOD

[75] Inventors: Chang Tau Chou, Troy; Jiamaw Doong, Farmington Hills; Jian Yang, West Bloomfield, all of Mich.

[73] Assignee: Ford Global Technologies, Inc., Dearborn, Mich.

[21] Appl. No.: 09/107,723

[22] Filed: Jun. 30, 1998

[51] Int. Cl.[7] .................................................. B60R 21/32
[52] U.S. Cl. ....................................... 280/735; 280/730.2
[58] Field of Search ............................... 280/730.2, 734, 280/735

[56] References Cited

U.S. PATENT DOCUMENTS

| | | | |
|---|---|---|---|
| 4,819,960 | 4/1989 | Breed | 280/734 |
| 4,842,301 | 6/1989 | Feldmaier | 280/735 |
| 4,851,705 | 7/1989 | Musser et al. | 307/10.1 |
| 4,988,862 | 1/1991 | Beltz | 250/277.15 |
| 5,141,193 | 8/1992 | Behr | 248/309.1 |
| 5,202,831 | 4/1993 | Blackburn et al. | 364/424.05 |
| 5,222,761 | 6/1993 | Kaji et al. | 280/728.1 |
| 5,326,133 | 7/1994 | Breed et al. | 280/735 |
| 5,394,358 | 2/1995 | Huang | 364/669 |
| 5,434,409 | 7/1995 | Meyer et al. | 180/274 |
| 5,441,301 | 8/1995 | Breed et al. | 280/735 |
| 5,484,166 | 1/1996 | Mazur et al. | |
| 5,587,906 | 12/1996 | McIver et al. | 364/424.045 |
| 5,737,224 | 4/1998 | Jeenicke et al. | 364/424.055 |
| 5,767,766 | 6/1998 | Kwun | 340/436 |
| 5,788,273 | 8/1998 | Jeenicke et al. | 280/735 |
| 5,845,937 | 12/1998 | Smith | 280/784 |
| 5,890,084 | 3/1999 | Halasz et al. | 701/45 |
| 5,948,032 | 9/1999 | Huang et al. | 701/47 |
| 5,984,350 | 11/1999 | Hagan et al. | 280/735 |

*Primary Examiner*—Eric Culbreth
*Assistant Examiner*—L. Lum
*Attorney, Agent, or Firm*—Jerome R. Drouillard; Roger L. May

[57] ABSTRACT

A side impact sensor system is used in a vehicle having a side air-bag, a lower body component, and a body side with a front door belt line area. The system includes a body side impact sensor mounted to the body side at least as high as the front door belt-line area. A lower body side impact sensor is mounted to the lower body component inboard from the body side. A safing sensor is secured to the vehicle. Electronic control module is provided in the electrical communication with the side air-bag and with the sensors for sending firing signals to the side air-bag when the safing sensor and at least one of the body and lower body side impact sensors signal a sufficiently high lateral acceleration indicative of a side impact.

5 Claims, 2 Drawing Sheets

SIDE IMPACT SENSOR SYSTEM AND METHOD

TECHNICAL FIELD

The present invention relates to a vehicle side impact sensor system, and more particularly to a vehicle side impact sensor system which includes a pole-type side impact sensor and a cart-type side impact sensor used in conjunction with a safing sensor for deploying a side air-bag in a vehicle.

BACKGROUND OF THE INVENTION

Statistics shows that car to car type impacts and car-to-pole-type impacts account for 70 percent and 30 percent of major vehicle side impact accidents, respectively. In addition to FMVSS 214 (North American Dynamic Side Impact Standards) and ECE 95 (European Dynamic Side Impact Standards), which specify the safety requirements for car-to-car side impacts, the automotive industry has proposed regulations to specify the safety requirements for car to pole-type side impacts.

As shown in FIG. 1, car to car type side impact simulations are done under FMVSS and ECE standards by utilizing a moving deformable cart 10 to impact a stationary vehicle 12. This kind of test is referred to as "cart impact" in the auto industry. As shown in FIG. 2, the car-to-pole-type side impact is simulated by impacting a moving vehicle 12 against a stationary pole 14. This test is named "pole impact" in the auto industry. is desirable to provide a side impact sensor system capable of sensing both car to car and car-to-pole-type impacts separately for optimizing side air-bag deployment performance.

It is further desirable to provide a side impact sensor system which will not deploy the side air-bag when such deployment is unnecessary, such as in a shopping cart impact, a door slam, severe road vibration, etc.

It is also desirable to provide such a side impact sensor system in which air-bag deployment is achieved quickly during a side impact.

DISCLOSURE OF THE INVENTION

The present invention provides a side impact sensor system for a vehicle including a pole-type side impact sensor and a cart-type side impact sensor which are monitored to provide quick air-bag deployment while avoiding unwanted air-bag deployment.

More specifically, the present invention provides a side impact sensor system for use in a vehicle having a side air-bag, a lower body component, and a body side with a front door belt line area. The system includes a pole-type side impact sensor mounted to the body side at least as high as the front door belt line area and a cart-type side impact sensor mounted to the lower body component inboard from the body side. A safing sensor is also secured to the vehicle. An electronic control module is provided in electrical communication with the side air-bag and with the sensors for sending firing signals to the side air-bag when the safing sensor and at least one of the pole-type and cart-type side impact sensors signal a sufficiently high lateral acceleration indicative of a side impact.

The term "lower body component" used herein, to which the cart-type side impact sensor is mounted, preferably includes a floor pan, frame, underbody cross-member, rocker, or other such lower body component.

In an alternative embodiment, a second pole-type side-impact sensor is mounted to the body side at least as high as the front door belt line area, and spaced from the first pole-type side impact sensor.

The present invention also provides a method of deploying a side air-bag in a vehicle having a lower body component and a body side with a front door belt line area. The method includes: (a) sensing a first lateral acceleration at a pole-type side impact sensor location on the body side at least as high as the front door belt line area; (b) sensing a second lateral acceleration at a cart-type side impact sensor location on the lower body component inboard from the body side; (c) sensing a third lateral acceleration at a safing sensor location the vehicle; and (d) deploying the side air-bag if the third lateral acceleration and at least one of the first and second lateral accelerations exceed predetermined threshold values indicative of a side impact.

Accordingly, an object of the present invention is to provide a side impact sensor system which provides quick side air-bag deployment in cart-FMC type or pole-type side impacts while avoiding unwanted deployment by providing a back-up safing sensor.

The above object and other objects, features and advantages of the present invention are readily apparent from the following detailed description of the best modes for carrying out the invention when taken in connection with the accompanying drawings.

DETAILED DESCRIPTION OF THE PREFERRED EMBODIMENTS

Figure 1:
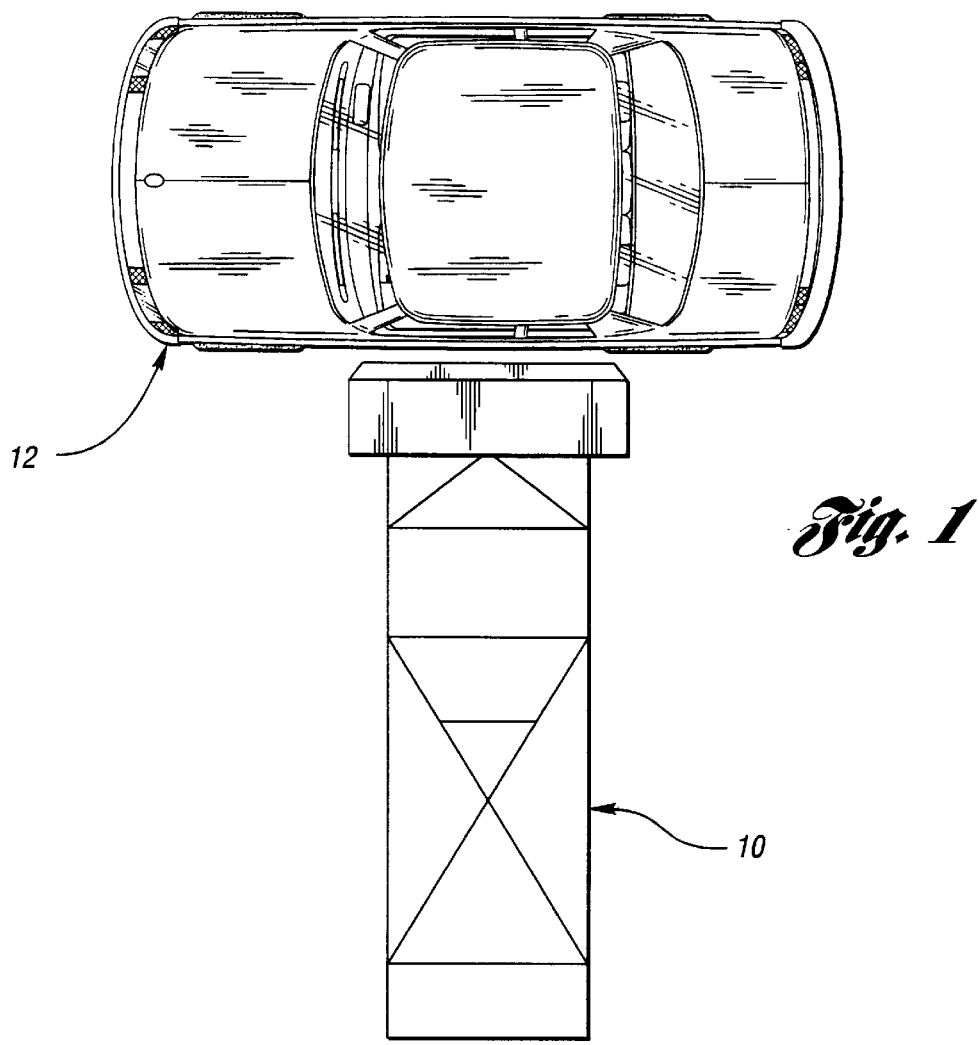
FIG. 1 shows a schematic overhead plan view of a cart impact test.
Figure 2:
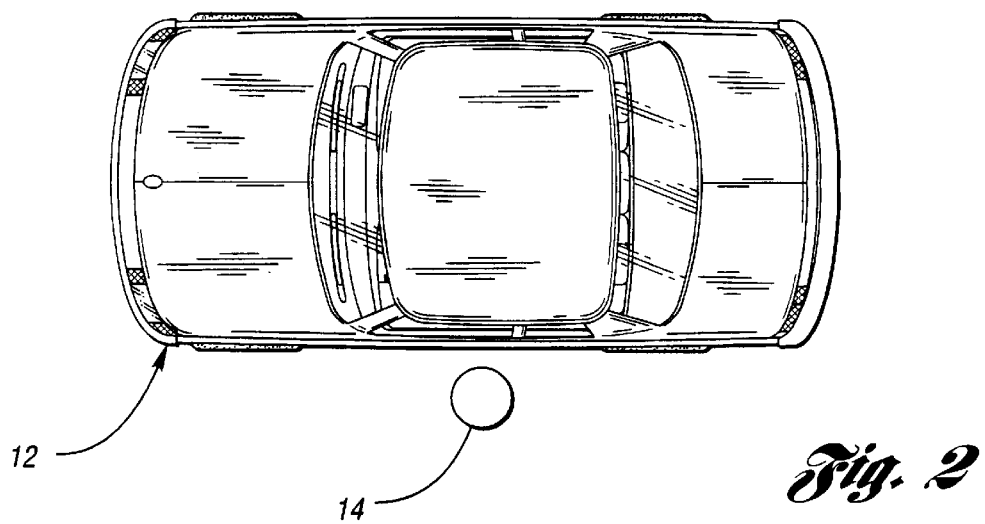
FIG. 2 shows a schematic overhead plan view of a pole impact test.
Figure 3:
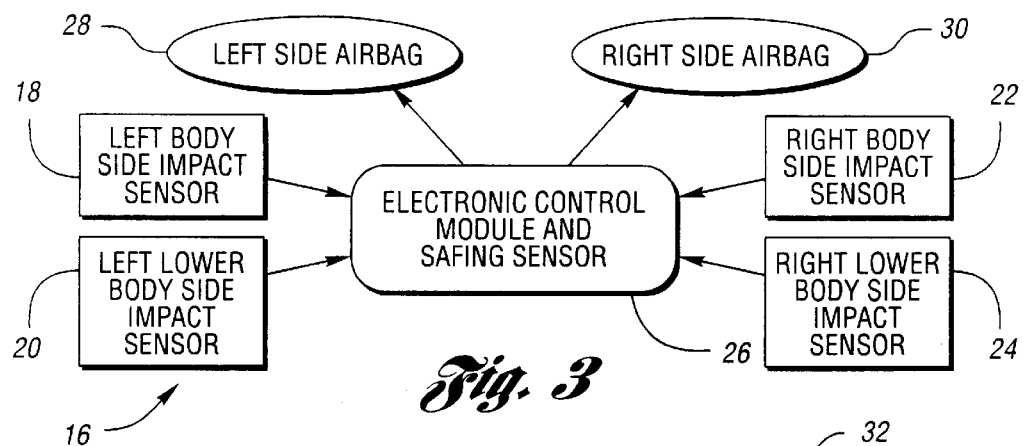
FIG. 3 shows a schematic of a quick response side impact sensor system in accordance with the present invention.
Figure 4:
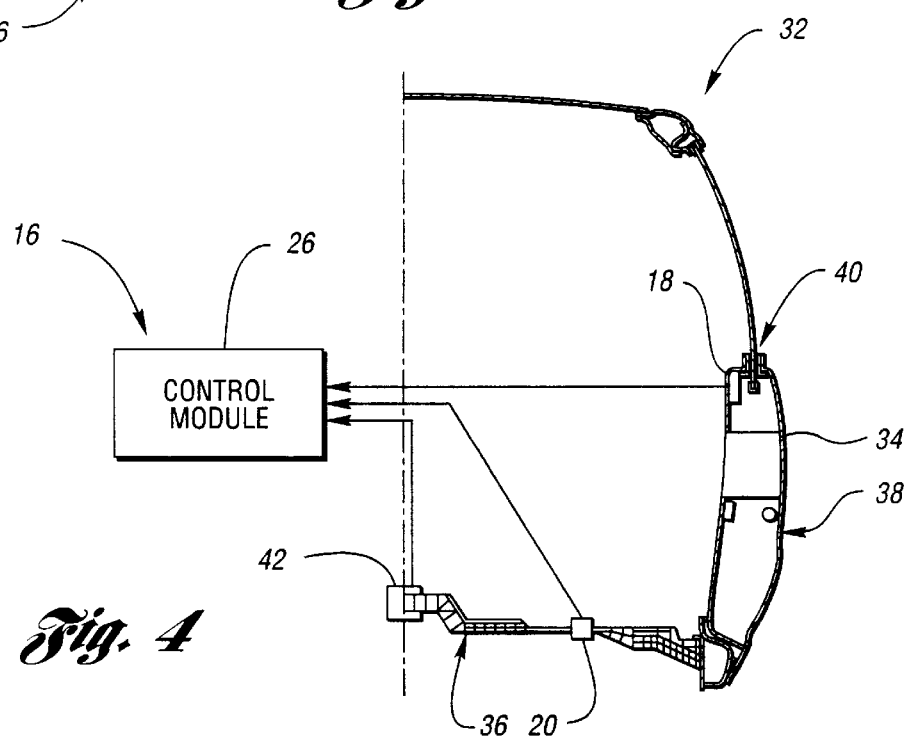
FIG. 4 shows a schematically arranged partial cross-sectional view of a vehicle incorporating a side impact sensor system in accordance with the present invention.

Referring to FIGS. 3 and 4, a side impact sensor system is shown in accordance with the present invention. As shown schematically in FIG. 3, the side impact sensor system 16 includes a left pole sensor 18, left cart sensor 20, right pole sensor 22 and right cart sensor 24 in electrical communication with an electronic control module 26, which includes an integral safing sensor. The electronic control module is in electrical communication with left and right side air-bags 28,30 for deploying the air-bags 28,30 when the safing sensor and at least one of the pole-type and cart-type side impact sensors 18, 20, 22, 24 signal is sufficiently high lateral acceleration indicative of a side-impact.

Referring to FIG. 4, a vehicle 32 is shown having a side impact sensor system 16 therein. The vehicle 32 includes a side air-bag 34, a lower body component 36, and a body side 38 with a front door belt line area 40. Preferably, the pole-type side impact sensor 18 is mounted to the body side 38 at least as high as the front door belt line area 40 so that the pole-type side impact sensor 18 is in proper position to sense the pole impact. The pole-type side impact sensor 18 may alternatively be mounted on the B-pillar upper.

Preferably, the cart-type side impact sensor 20 is mounted to the lower body component 36 inboard from the body side 38. The lower body component 36 could be a floor pan, frame, underbody cross-member, rocker (sill), or other such lower body component. The safing sensor 42 is preferably mounted on the center line of the vehicle on the floor pan. Alternatively, the safing sensor may be packaged integrally with the electronic control module 26, as illustrated in FIG. 3, or may be secured to the A-pillar, B-pillar, or other vehicle location.

The electronic control module 26 sends firing signals to the side air-bag 34 only when the signals from the safing sensor 42 and at least one of the pole-type side impact sensor 18 and cart-type side sensor 20 exceed predetermined threshold values indicative of a side impact. In this manner, "fire" and "no fire" ranges may be established to avoid unwanted side air-bag deployment in very low speed impacts, shopping cart impacts, door slams, severe road vibrations, etc. In other words, the safing sensor 42 provides a back-up signal to verify that the vehicle is actually experiencing a side impact. For example, if the pole-type side impact sensor 18 reads a lateral acceleration of 60 to 100 g's, the safing sensor 42 is also monitored as a back-up. If the safing sensor exceeds 2 to 4 g's, then it is determined that the vehicle is, in fact, experiencing a side impact, and the side air-bag 34 is deployed.

By providing both a pole impact sensor and a cart impact sensor, the side-impact sensor system is able to achieve quick response under either type of impact. The sensor system triggers the side air-bag within a short period of time after impact, which provides a longer duration for the side air-bag to be fully deployed.

It is contemplated that an electric circuit may be added to deactivate the impact sensor system when any vehicle door is opened in order to reduce unnecessary side air-bag deployment when a side door is slammed. The system may be reactivated after a specified time duration after all the vehicle doors have been closed. Additionally, a selection switch may be provided to deactivate the impact sensor system according to the occupant's wishes.

The present invention also provides a method of deploying a side air-bag in a vehicle having a lower body compartment and a body side wall with a front door belt line area. The method comprises:

a) sensing a first lateral acceleration at a pole-type side impact sensor location on the body side at least as high as the front door belt line area;

b) sensing a second lateral acceleration at a cart-type side impact sensor location on the lower body component inboard from the body side;

c) sensing a third lateral acceleration at a safing sensor location on the vehicle; and d) deploying the side air-bag if the third lateral acceleration and at least one of the first and second lateral accelerations exceed predetermined threshold values indicative of a side impact.

Figure 5:
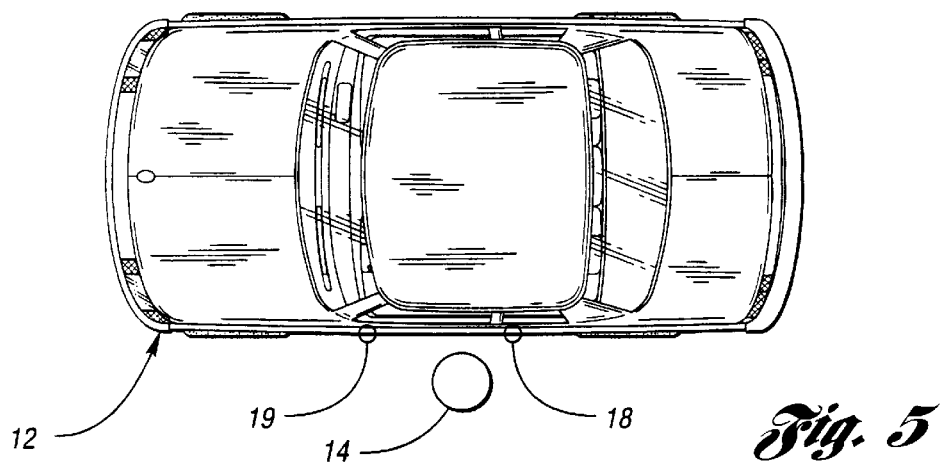
FIG. 5 shows a schematically arranged overhead plan view of a pole impact test with dual pole sensors in accordance with an alternative embodiment of the invention.

Referring to FIG. 5, an alternative embodiment of the invention is shown. In this embodiment, a vehicle 12 is equipped with two pole sensors 18,19. This system prevents unnecessary side air-bag deployment during certain pole impacts, such as when a pole impact occurs far away from the occupant. The digital signal processing algorithm of the pole sensors can be calibrated to achieve (a) both pole sensors sending out a firing signal to the control module if the pole contact position falls between these two pole sensors, or (b) either one or none of the pole sensors sending out a firing signal to the control module if the pole contact position is in front of both of the pole sensors or behind both pole sensors in the longitudinal direction. In addition, the control module is set to trigger the side air-bag only if it receives firing signals from both of the pole sensors. Therefore, the side air-bag will be deployed only if the pole impact occurs between these pole sensors 18,19.

The crash behaviors of the pole and cart impacts are quite different. The dual sensor system described herein utilizes two impact sensors, i.e., pole and cart sensors, to simplify the complexity due to the coupling of the pole and cart impacts. If only one impact sensor is used to replace the functions of the two impact sensors in a dual sensor system, the one sensor needs to sense the "must fire" and "no fire" cases for both pole and cart impacts. The digital signal processing algorithm for the one sensor becomes more complicated, unreliable, and difficult to meet the sensor requirements. The dual sensor system allows both pole and cart sensors to use less complex, more reliable and different digital signal processing algorithms. Therefore, the dual sensor system is simple, reliable, cost effective, and more effective in meeting the sensor requirements.

While the best modes for carrying out the invention have been described in detail, those familiar with the art to which this invention relates will recognize various alternative designs and embodiments for practicing the invention within the scope of the appended claims.

What is claimed is:

1. A side impact sensor system for use in a vehicle having a side air-bag, a lower body component on an underside of the vehicle, and a body side with a front door belt line area, the system comprising:

a body side impact sensor mounted to the body side at least as high as the front door belt line area;

a lower body side impact sensor mounted to the lower body component inboard from the body side, said lower body component comprising a vehicle floor pan;

a safing sensor secured to the vehicle; and an electronic control module in electrical communication with the side air-bag and with said sensors for sending firing signals to the side air-bag when said safing sensor and at least one of said body and lower body side impact sensors signal a predetermined level of lateral acceleration indicative of a side impact.

2. The side impact sensor system of claim 1, further comprising a second body side impact sensor mounted to the body side at least as high as the front door belt line area.

3. The side impact sensor system of claim 1, wherein said safing sensor is connected to said electronic control module.

4. A method of deploying a side air-bag in a vehicle having a vehicle floor pan an underside of the vehicle and a body side with a front door belt line area, the method comprising:

sensing a first lateral acceleration at a body side impact sensor location on the body side at least as high as the front door belt line area;

sensing a second lateral acceleration at a lower body side impact sensor location on the vehicle floor pan inboard from the body side;

sensing a third lateral acceleration at a safing sensor location on the vehicle; and deploying the side air-bag if said third lateral acceleration and at least one of said first and second lateral accelerations exceed predetermined threshold values indicative of a side impact.

5. The method of deploying a side air-bag of claim 4, further comprising sensing a fourth lateral acceleration at a second body side impact sensor location on the body side at least as high as the front door belt line area.

* * * * *